(No Model.) 2 Sheets—Sheet 1.
T. LONG.
DEVICE FOR THAWING HIGH EXPLOSIVES.
No. 538,025. Patented Apr. 23, 1895.
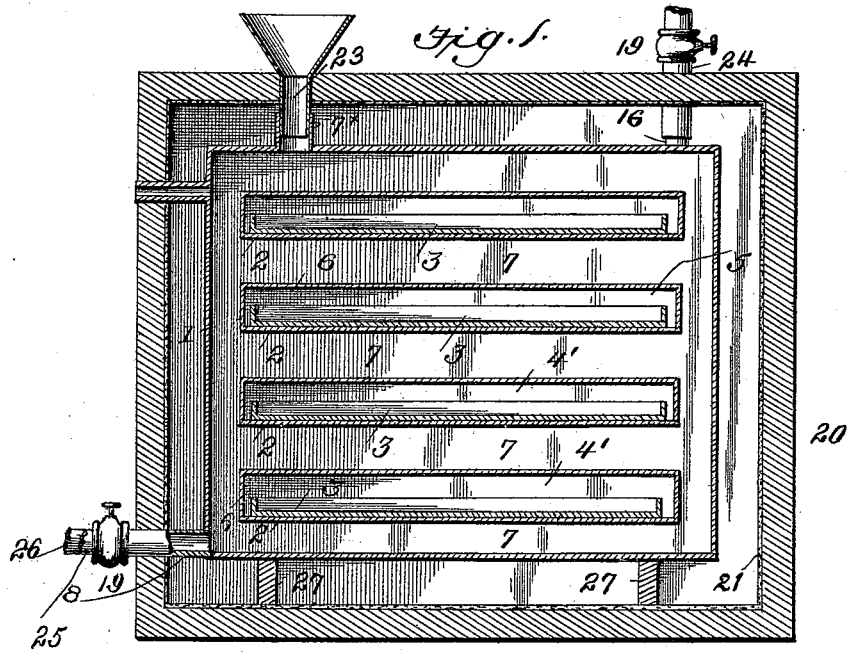
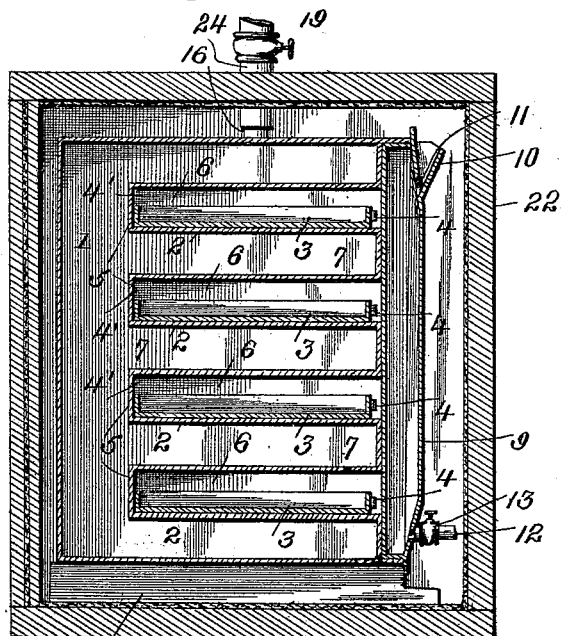

(No Model.) 2 Sheets—Sheet 2.
T. LONG.
DEVICE FOR THAWING HIGH EXPLOSIVES.

No. 538,025. Patented Apr. 23, 1895.

Witnesses  
John Jamie  
M. A. Drau.

Inventor  
Thomas Long  
By H. A. villon  
Attorney

UNITED STATES PATENT OFFICE.

THOMAS LONG, OF PHILLIPSBURG, MONTANA.

DEVICE FOR THAWING HIGH EXPLOSIVES.

SPECIFICATION forming part of Letters Patent No. 538,025, dated April 23, 1895.

Application filed August 29, 1894. Serial No. 521,632. (No model.)

*To all whom it may concern:*

Be it known that I, THOMAS LONG, a citizen of the United States, residing at Phillipsburg, in the county of Granite and State of Montana, have invented certain new and useful Improvements in Apparatus for Thawing Explosives; and I do declare the following to be a full, clear, and exact description of the invention, such as will enable others skilled in the art to which it appertains to make and use the same.

My invention has relation to apparatus designed for use in thawing explosives quickly and thoroughly and without any danger of explosion, and among the objects in view is to provide an extremely simple, inexpensive and efficient device of the described character which is extremely well adapted for the purpose in view and which may be used with either hot water or steam, and with the above and other objects in view my invention consists in the novel construction, arrangement and combination of parts as hereinafter fully described, illustrated in the accompanying drawings and pointed out in the appended claims.

Figure 3:
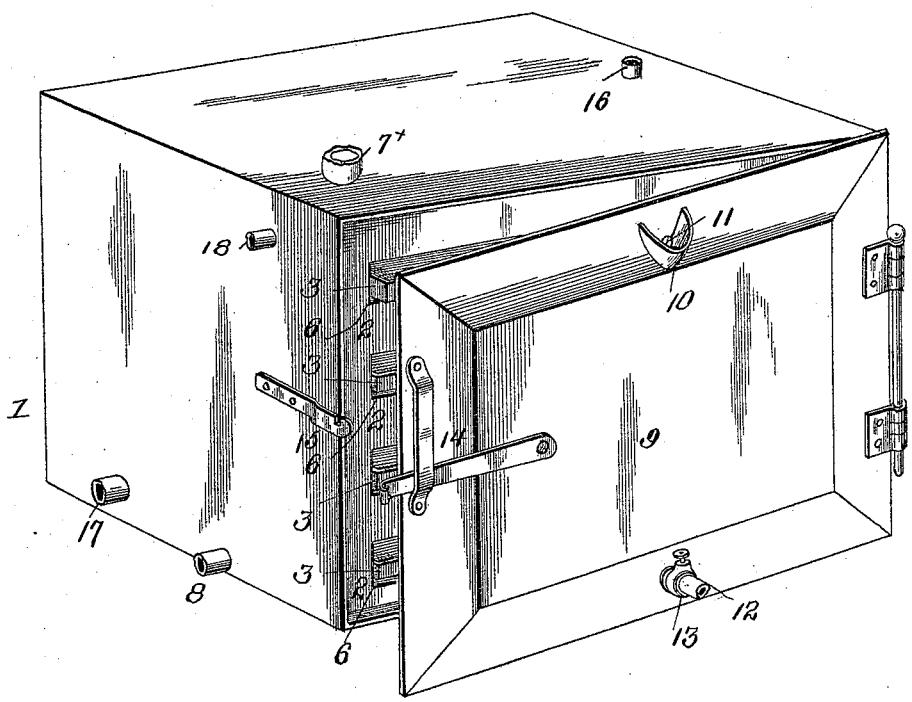
Figure 4:
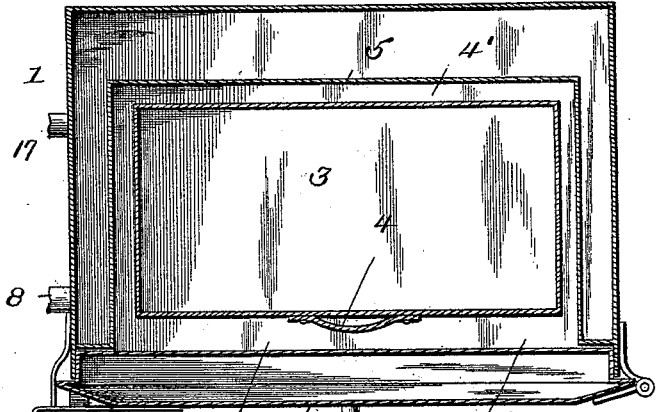

In the drawings:—Figure 1 is a vertical longitudinal section of my thawing apparatus. Fig. 2 is a vertical transverse section thereof. Fig. 3 is a perspective view of the inner casing. Fig. 4 is a horizontal section thereof.

My invention comprises essentially a casing provided with a series of supporting ledges or shelves adapted to support trays or pans containing the explosive to be thawed and into which casing either hot water or steam is adapted to be introduced, said casing being provided with suitable inlet and discharge ports or apertures for the thawing medium.

My invention also comprises a double door hinged to the casing and adapted to receive hot water or steam, it being provided with suitable inlet and discharge apertures for that purpose; and my invention further comprises an outer jacket or casing into which the described inner casing is adapted to be removably placed, said outer jacket being designed to prevent loss of heat radiated from the inner jacket and also to prevent the admission of the cold outside air to the inner casing during the thawing operation.

In order that my invention may be clearly understood both as to its construction and operation, I will proceed to describe the same in detail.

1 indicates the inner casing which I construct of any suitable or desired sheet metal and the same is provided with a number of horizontally arranged racks, shelves or ledges 2, which shelves are spaced sufficiently far apart to permit of the ready insertion and withdrawal of the pans 3 containing the powder or other explosive to be thawed. Said pans are also constructed of sheet metal and are provided with suitable handles 4 to enable the pans to be conveniently slid into and out of the casing 1.

The shelves are somewhat smaller than the casing to provide spaces 4' for the reception of the hot water or steam and are closed at the ends and sides by partitions 5 whereby spaces 6 are formed between the shelves which are adapted to receive the pans or trays 3 and which spaces 6 are therefore practically water and steam tight at the ends and sides, while spaces 7 are also formed between the shelves, adapted to receive the thawing medium—hot water or steam.

It will be seen that by the described construction and arrangement of parts, the hot water or steam is permitted to completely surround the shelves at the ends and therefore is adapted to thoroughly heat the spaces 6 containing the trays 2.

The casing is provided with suitably arranged filling and discharge nozzles or pipes $7^\times$ and 8 respectively, through which the hot water necessary to effect the thawing of the explosive may be introduced into and discharged from the casing and said pipes may each be provided with a cut off valve or cock as shown.

The casing is adapted to be closed upon its front side by means of a suitable hinged door 9 and in order that additional heat may be communicated to the spaces 6 and consequently the explosive contained in the trays, I make the door 9 in the form of a double door and provide it with a funnel shaped filling spout 10 and aperture 11 through which hot water may be introduced into the door, and also provide the latter with a discharge pipe 12 near the bottom having a cock 13 whereby to discharge the water from the door when desired.

The door may be provided with a suitable latch 14 adapted to engage a keeper 15 on the casing, whereby said door may be kept securely closed.

The casing is also provided with suitably arranged filling and discharge pipes or nozzles 16 and 17 respectively whereby when steam is desired to be used in lieu of hot water, it may be introduced into and discharged from the casing which filling pipe for the steam may be connected with any suitable source of steam supply. The said pipes 16 and 17 may have cocks 19 for obvious purposes.

An overflow pipe 18 is provided in the casing for overflow of water.

In order to prevent loss of heat by radiation from the casing, I prefer to use an outer jacket or casing 20 into which the casing 1 is adapted to be conveniently placed and withdrawn when desired and I preferably construct the said outer jacket of wood and line the same upon the interior with asbestos 21 as seen at the sides of the jacket. If desired the jacket 20 may be constructed of two pieces or layers of wood between which the asbestos is arranged as shown. The said outer casing is provided with a suitable hinged door 22 which is also lined upon the inner side with asbestos.

In the casing 20 I provide pipes 23 and 24 corresponding in position with the pipes $7^x$ and 16 respectively and adapted to register therewith to permit of the introduction of water or steam as the case may be and said casing 20 is also provided with pipes 25 and 26 corresponding in position with the pipes 8 and 17 and adapted to register therewith to permit of the discharge of the hot water or steam.

An aperture is provided in the end of the casing 20 through which the overflow pipe 18 may project.

I prefer to make the filling pipe 23 of a funnel-shape to provide for the convenient pouring of the water.

The bottom of the casing 20 may have cleats 27 upon which the casing 1 may be supported.

The operation of my device may be briefly described as follows: The explosive to be thawed having been placed in the trays, the latter are slid into the spaces 6 and the doors of the said casing 1 and outer casing 20 closed. Hot water, or steam as the case may be, is then introduced into the casing until it completely fills the same and the whole is then allowed to stand until the process of thawing is completed after which the cocks of the hot water discharge pipe (if hot water be used) is opened to allow of the discharge of the hot water and the doors of the two casings opened and the trays 3 removed.

If steam be used it will be found that the best results will be attained by practically passing a continuous current of steam through the device, while in the case of hot water it will be found that replenishing of the device need be done only about every twelve hours, and this is done by withdrawing about one-half of the cooled water and replacing the same with hot water. However, practice will demonstrate when replenishing need be resorted to and whether a continuous or interrupted current of steam be necessary to pass through the device.

My device will be found absolutely safe in its use as there will be no possibility of explosion resulting from the use of either hot water or steam. Furthermore, it will be found that the thawing of the explosive will be quick and thorough.

My apparatus may be made in various sizes as will be evident, and changes in the construction and arrangement of details may be resorted to without departing from the invention.

Having thus described my invention, what I claim, and desire to secure by Letters Patent, is—

1. In a device for thawing explosives, a casing provided with a series of horizontal shelves arranged so as to provide spaces between them for the reception of a heating medium, partitions arranged between the alternate shelves so as to provide spaces closed at the ends and rear side for the reception of trays containing the material to be thawed, and said shelves being somewhat shorter than the casing whereby to form spaces between them and the casing to receive the thawing medium, a door hinged to the casing and adapted to close the front thereof, and filling and discharge pipes carried by the casing for the purpose specified.

2. In a device for thawing explosives, the combination with a casing provided with a series of shelves arranged so as to provide spaces between them for the reception of a heating medium, and to provide spaces for the reception of the material to be thawed, and to provide spaces between them and the casing also for the reception of said heating medium, filling and discharge pipes carried by said casing, of an outer jacket or casing into which said inner casing is adapted to fit, and filling and discharge pipes carried by said outer jacket and adapted to register with the like pipes of the inner casing, for the purpose specified.

3. In a device for thawing explosives, the combination with a casing provided with a series of shelves arranged so as to provide spaces between them for the reception of a heating medium, to provide spaces for the reception of the material to be thawed and to provide spaces between them and the casing also for the reception of the heating medium;

filling and discharge pipes carried by the casing for hot water and filling and discharge pipes for steam, of an outer jacket or casing into which the described inner casing is adapted to fit, and filling and discharge pipes for hot water and steam carried by the outer jacket, adapted to register with the filling, and discharge pipes for hot water and steam carried by the inner casing, for the purpose specified.

In testimony whereof I affix my signature in presence of two witnesses.

THOMAS LONG.

Witnesses:
J. A. MATTHEAS,
F. M. FREYSCHLAG.